United States Patent [19]

Pillar

[11] 4,113,672
[45] Sep. 12, 1978

[54] MOLDING EXPANDABLE STYRENE POLYMER PARTICLES

[75] Inventor: Walter O. Pillar, Monroeville, Pa.

[73] Assignee: Arco Polymers, Inc., Philadelphia, Pa.

[21] Appl. No.: 848,972

[22] Filed: Nov. 7, 1977

Related U.S. Application Data

[63] Continuation-in-part of Ser. No. 744,571, Nov. 24, 1976, abandoned.

[51] Int. Cl.$^2$ .................................................. C08V 9/18
[52] U.S. Cl. .............................. 521/60; 260/45.85 B; 260/45.95 R; 260/45.95 H; 260/45.75 H; 260/45.78 T; 521/88; 521/93; 521/146; 521/147
[58] Field of Search ..................... 260/2.5 FP, 45.7 P, 260/DIG. 24

[56] References Cited

U.S. PATENT DOCUMENTS

| | | | |
|---|---|---|---|
| 2,676,927 | 4/1954 | McCurdy et al. | 260/DIG. 24 |
| 3,058,926 | 10/1962 | Eichhorn | 260/2.5 FP |
| 3,368,916 | 2/1968 | Hattori | 260/45.7 P |

*Primary Examiner*—Morton Foelak
*Attorney, Agent, or Firm*—Lewis J. Young

[57] ABSTRACT

Expandable styrene polymer particles having reduced flammability are made by incorporating from 0.1 to 15 weight percent of non-polymeric organic halogen compounds into the polymer during impregnation of the polymer particles with a blowing agent in aqueous suspension. The addition of 0.001 to 0.5 weight percent of dialkyl tin maleates or fumarates during the impregnation step produces expandable styrene polymer particles with greatly improved molding characteristics such as reduced pruning tendency, increased mold fusion, and greater dimensional stability. Addition of a synergistic amount of 0.001 to 0.4 weight percent of a hindered phenolic antioxidant with the tin compounds gives improved molding characteristics with retention of polymer molecular weight.

8 Claims, No Drawings

MOLDING EXPANDABLE STYRENE POLYMER PARTICLES

REFERENCE TO RELATED APPLICATIONS

This application is a continuation-in-part of my copending application Ser. No. 744,571, filed Nov. 24, 1976 now abandoned.

BACKGROUND OF THE INVENTION

The invention relates to a process for improving the moldability of expandable styrene polymer particles having reduced flammability.

Polymer foams are highly desirable in building construction because of their light weight and good heat insulating property. A prerequisite for use in the construction industry is the foam must have reduced flammability. Many halogenated organic compounds have been proposed as additives for the purpose of reducing the flammability of the foams.

In the case of expandable styrene polymer particles, the non-polymeric halogen compounds are often added to the particles by heating an aqueous suspension of styrene polymer particles in the presence of the halogen compound and a blowing agent until the particles are impregnated with the additives. Impregnation with the blowing agent to produce expandable styrene polymer particles may be carried out at temperatures between 60° and 150° C. However, when the organic halogen compounds are added to the impregnation system, lower temperatures, usually 60°-90° C., are used to prevent decomposition of the halogen compound which may in turn cause degradation of the polymer and subsequent impairment of the expanding and molding properties of the polymer. These lower temperatures require longer time for the impregnation process and, in the case of larger polymer particles, the particles may not be completely impregnated, as shown by the presence of hard cores in the particles after expansion. Shorter times of impregnation and the elimination of hard cores in the particles can both be accomplished by carrying out the impregnation at temperatures higher than 100° C.

Particles impregnated at these higher temperatures may exhibit molding properties which are inferior to the properties of particles prepared at the lower temperatures. Thus, the particles may produce prepuff having a surface skin, i.e., denser foam at the surface and lighter foam at the cores and exhibit increased "pruning" (i.e. a nonspherical shape due to large internal cells). The pre-puff may also contain water occluded from the suspension. On molding, these pre-puff particles exhibit reduced fusion and poor dimensional stability.

SUMMARY OF THE INVENTION

It has now been found that the addition of 0.001 to 0.5 weight percent of dialkyl tin maleate to the styrene polymer particles, during the impregnation of the particles with blowing agents in aqueous suspension in the presence of organic halogen compounds at temperatures between 100° and 125° C., produces an expandable particle which has improved pre-puff properties and can be molded to produce foamed parts having improved fusion, longer mold cool times, good dimensions, reduced pruning, and less surface skin.

DETAILED DESCRIPTION OF THE INVENTION

In accordance with the invention, a variety of expandable thermoplastic homopolymers and copolymers can be made to have reduced flammability. The polymers may be derived from vinyl aromatic monomers, such as styrene, vinyl toluene, isopropylstryene, alpha-methylstyrene, chlorostyrene, tert-butylstyrene, etc., as well as copolymers prepared by the copolymerization of at least 50 percent by weight of a vinyl aromatic monomer with monomers such as butadiene, alkyl methacrylates, alkyl acrylates, acrylonitrile and maleic anhydride. For the purpose of convience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as for example in U.S. Pat. No. 2,983,692, by suspending the particles in water with the aid of suspending agent systems such as tricalcium phosphate in combination with an anionic surfactant. The polymer to water ratio may be varied between 0.3:1 and 2.3:1 in these suspensions.

The blowing agents are compounds which are gases or which will produce gases on heating. Suitable agents include aliphatic hydrocarbons containing from 4–7 carbon atoms in the molecule, such as butane, pentane, cyclopentane, hexane, heptane, cyclohexane, and the halogenated hydrocarbons which boil at a temperature below the softening point of the polymer. Mixtures of these agents may also be used, such as a 50/50 mixture of isopentane/n-pentane, or a 55/45 mixture of trichlorofluoromethane/n-pentane. Usually from 3 to 20 percent of blowing agent per 100 parts of polymer is incorporated by the impregnation.

Conventionally, the impregnations are carried out at temperatures from 60° to 90° C. when the non-polymeric halogen-compounds are utilized, because higher temperatures tend to decompose the halogen-compound causing discoloration of the polymer and actual degradation of the polymer at the particle surface. Unfortunately, the impregnation is slow at these temperatures and the particles are not always impregnated to the core of the particle. This results, on expansion of the particle, in a hard core in the foamed particle. To eliminate this hard core problem, it is desirable to impregnate at temperatures of between 100° and 125° C.

The dialkyl tin maleates and furmarates useful in the invention can be made by reacting dialkyl tin dichloride with the appropriate acid, maleic or fumaric. The alkyl substituents may be the lower alkyl radicals having 1–20 carbon atoms, preferably 1–8, such as methyl, ethyl, propyl, butyl, isobutyl, and isoctyl. Although the tin maleates may be cyclic, having a ratio of tin to maleate of 1:1, the compounds are normally in the polymeric form

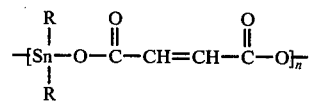

where R is the alkyl group as described above, and n is an integer. Most of these tin compounds are available commercially as stabilizers for polyvinyl chloride. The reaction of dialkyl tin halides with maleic acid or anhydride often leads to isomerization of all or part of the cis-maleate to the trans-fumarate structure. Some of the commercial stabilizers are sold as mixtures of the maleate and fumarate. All forms are suitable for the present invention. The tin compounds are useful in amounts between 0.001 and 0.5 weight percent based on total polymer.

The dialkyl tin maleates do not stabilize the molecular weight of the styrene polymers in the process. Thus, impregnation at the 100° – 125° C. temperatures causes the polymer to degrade. The tin compounds do improve the molding characteristics of the polymer foams, however.

The degradation of the polymer during the impregnation can be prevented by use of a molecular weight stabilizer for the non-polymeric organic halogen compound used to reduce the flammability of the polymer. Examples of such stabilizers are the sulfides or metal mercaptides taught in my copending application Ser. No. 689,233, filed May 24, 1976, the barium/cadmium organic complex taught in my copending application Ser. No. 653,688, filed Jan. 30, 1976, and especially preferred are the hindered phenolic antioxidants as taught in my copending application Ser. No. 689,026, filed May 24, 1976.

The hindered phenolic antioxidants suitable for this use are the alkylated phenols where the alkyl groups contain 3 to 20 carbon atoms and at least one such alkyl group is located in the position ortho to the hydroxy group of the phenol. The preferred alkyl groups contain 3 to 8 carbon atoms. Conveniently, the alkyl groups may be tert-butyl because of the ready availability of isobutylene as an alkylation starting material. The alkyl groups must be large enough to sterically hinder the hydroxy group from showing tautomerism.

Also suitable antioxidants of this type are the bis-, tris-, and higher condensation products of the hindered alkylated phenols with aldehydes or ketones. Examples of common aldehydes used for the condensation reaction are formaldehyde, acetaldehyde, propionaldehyde, butyraldehyde, crotonaldehyde and benzaldehyde. Examplary of the common ketones are acetone, ethyl methyl ketone and diethyl ketone.

Preferably, the total amount of antioxidant added should be between 0.001 and 0.40% by weight based on the weight of styrene polymer particles to be impregnated. Less than 0.001 weight % of the antioxidant does not prevent degradation of the polymer particles, while greater than 0.40% by weight does not appear to serve any useful function. Generally, the amount of antioxidant required is dependent upon the amount of organic halogen compound used and the type of antioxidant used.

In the process of the invention, styrene polymer particles are suspended in water in a ratio of polymer:water of from 0.3:1 to 2.3:1 with the aid of a difficulty-water-soluble suspending agent, such as tricalcium phosphate and an anionic surfactant extender. To the suspension is added from 0.2 to 15 percent by weight, based on polymer, of the desired halogen-compound, from 3.0 to 20 percent by weight of the blowing agent, from 0.001 to 0.5 percent by weight of dialkyl tin maleate or fumarate, and if desired from 0.001 to 0.40 percent by weight of a molecular weight stabilizer or antioxidant for the halogen compound. If used, 0.2 to 2.0 percent by weight of an organic peroxide synergist is also added at this point.

The suspension is then heated to a temperature, preferably between 100° C. and 125° C. for 1 to 15 hours to impregnate the polymer particles and uniformly disperse the halogen-compound throughout the polymer. After the impregnation is complete, the particles are cooled to room temperature, acidified with hydrochloric acid, separated from the aqueous medium, and washed with water. The particles are then dried to produce expandable particles which when molded produce foamed articles having reduced flammability.

Depending upon the end use, foamed articles containing larger amounts of halogen-compound, such as amounts greater than 3.0 parts per 100 parts of polymer, are given reduced flammability without the aid of synergistic amounts of organic peroxides. With lesser amounts of the halogen-compound it is preferred to use from 0.2 to 2.0 parts per 100 parts of polymer of an organic peroxide to aid in the decomposition of the halogen-compound when burned.

Suitable for the synergistic-action are those organic peroxides which decompose at temperatures above 125° C. This limitation is necessary to prevent premature decomposition of the peroxide during the impregnation step. Useful examples are dicumyl peroxide, 2,5-dimethyl-2-5-di(tert-butylperoxy)hexane, 1,3-bis (α-tert-butylperoxyisopropyl)benzene, di(3-tert-butylperoxy-1,3-dimethylbutyl)carbonate, and 2,5-dimethyl-2,5-di(tert-butylperoxy)-3-hexyne.

Suitable organic halogen compounds are any of the highly halogenated compounds known to impart reduced flammability to styrene polymer particles. Typical examples are the 1,1,2,3,4,4-hexabromo-2-butene of U.S. Pat. No. 3,819,547; and brominated arylidene ketones of U.S. Pat. No. 3,766,136; the brominated cinnamic acid esters of U.S. Pat. No. 3,766,249; and the brominated aryl butanes of U.S. Pat. No. 3,826,766.

Other additives can, of course, be added during the impregnation process, such as pigments, lubricants, plasticizers, and antisticking agents such as the polyoxyethylene sorbitan monofatty acids.

The invention is further illustrated by the following examples, wherein percentages are percent by weight unless otherwise indicated.

EXAMPLE I

To a 12-oz. Crown cap bottle was charged 100 g. of water, 2.0 g. of tricalcium phosphate, 0.05 g. of sodium dodecylbenzene sulfonate, 100 g. of polystyrene beads having bead size of between on 30 and through 16 mesh, U.S. Standard Sieve, and an intrinsic viscosity of 0.77 at 30° C. in toluene, 1.1 g. of pentabromomonochlorocyclohexane, 0.875 g. of a mixture of 40 weight percent 1,3-bis (α-tert-butylperoxyisopropyl) benzene adsorbed onto 60 weight percent tricalcium phosphate, 8.5 g. of n-pentane, and, as additive, 0.1 g. (0.1% by wt. based on polymer) of di-n-butyl tin maleate.

The bottle was capped and cycled 2 hours at 90° C. followed by 10 hours at 100° C. in an oil bath polymerizer. The bottles were then cooled to room temperature, opened, acidified with hydrochloric acid, the beads separated from the aqueous medium, washed with water, and air dried. The resulting polystyrene had an intrinsic viscosity of 0.69, indicating significant degradation of the polymer during impregnation.

The beads were pre-expanded by heating for 2 minutes in steam at 5 psig to give prepuff having a bulk density of about 1.0 pounds per cubic foot (pcf).

The prepuffed beads were then overcharged to a 5-½ × 5-½ × ½ inch mold cavity, dampened with a water spray, pressed between platens heated to 121° C. for 1 minute, and cooled by circulating water in the platens. The resulting foam plaque had the exact dimensions of the mold, and was fused to the extent of 88% with a foam density of 1.6 pcf.

A 1 × 5 × ½ inch specimen cut from the foam plaque was hung lengthwise from a clamp over a microburner having a ¾ inch yellow flame. The flame was positioned ¾ inch from the bottom edge of the foam sample for 3 seconds. The average vertical burn time (time from withdrawal of the flame to flame-out of the foam) for 5 samples was 0.5 seconds. Polystyrene foam not containing the pentabromomonchlorocyclohexane burned completely in this test.

For comparison, a second bottle was charged identically to the first charge, except without the tin additive, and was heated in the same manner. The resultant polymer had an intrinsic viscosity of 0.66 indicating substantial polymer degradation. On pre-expansion as before, the prepuff had a bulk density of 0.93 pcf. and exhibited "pruning" (i.e. a non-spherical shape due to large internal cells). Foam plaques molded as before were fused to 69% but the molding had shrunk away from the mold and exhibited heat sensitivity, i.e., collapse of the foam cells to an unacceptable degree, and had a foam density of 1.6 pcf. The average vertical burn time for 5 samples was 0.6 seconds.

EXAMPLE II

To illustrate the use of an antioxidant in conjunction with the tin stabilizers of the present invention to produce particles having reduced flammability and no degradation of the styrene polymer, to each of several 12-oz. Crown cap bottles was charged 100 g. of water, 2.0 g of tricalcium phosphate, 0.05 g. of sodium dodecylbenzene sulfonate, 100 g. of polystyrene beads having bead size of between on 30 and through 16 mesh, U.S. Standard Sieve, and an intrinsic viscosity of 0.77 at 30° C. in toluene, 1.1 g. of pentabromomonochlorocyclohexane, 0.875 g. of a mixture of 40 weight percent 1,3-bis (α-tert-butylperoxyisopropyl) benzene adsorbed onto 60 weight percent tricalcium phosphate, 8.5 g. n-pentane, and the amounts of di-tert-butyl-p-cresol (DBPC) as stabilizer, and the amounts of dibutyl tin maleate shown in Table I.

The bottles were capped and cycled 2 hours at 90° C. followed by 3.5 hours at 115° C. in an oil bath polymerizer. The bottles were then cooled to room temperature, opened, acidified with hydrochloric acid, the beads separated from the aqueous medium, washed with water, and air dried. The intrinsic viscosities of the resulting polystyrene beads were measured at 30° C. in toluene and are shown in Table I.

The beads were pre-expanded by heating for 2 minutes in steam at 5 psig. to give prepuff having a bulk density of less than 1.0 pounds per cubic foot (pcf.) Cell sizes were measured on these prepuffs and reported as external size/internal size in mils.

The prepuff beads were then overcharged to a 5½ × 5½ × ½ inch mold cavity, dampened with a water spray, pressed between platens heated to 115° C. for 1 minute, and cooled by circulating water in the platens. The foam densities and percent fusion were determined and recorded in Table I. The vertical burn time, in seconds, was determined as in Example I.

Table I

| Run No. | 1 | 2 | 3 | 4 | 5 | 6 | 7 |
|---|---|---|---|---|---|---|---|
| DBPC,% | — | 0.025 | 0.05 | 0.025 | 0.05 | 0.025 | — |
| Dibutyltinmaleate, % | — | — | — | 0.025 | 0.025 | 0.05 | 0.1 |
| Intrinsic Viscosity | 0.63 | 0.77 | 0.76 | 0.75 | 0.73 | 0.73 | 0.68 |
| Cell size, External/internal, mils | Heavy prune | Slight prune | Slight prune | 1-4/2-7 | 1-3/2-7 | 1-5/2-4 | 1-2/2-3 |
| Mold density, pcf. | 1.5 | 1.2 | 1.3 | 1.2 | 1.3 | 1.2 | 1.0 |
| fusion, % | 0 | 64 | 36 | 87 | 89 | 83 | 82 |
| Vertical burn, sec. | 1.0 | 0.6 | 1.0 | 0.7 | 0.6 | 0.5 | 0.8 |

The data clearly show that, although the tin stabilizer alone, in Run No. 7, does not prevent polymer degradation as shown by intrinsic viscosity loss, the tin compound does allow better moldings to be made having no pruning, better cell size, and greater fusion than either the control Run no. 1. The Runs no. 2 or 3, which have DBPC antioxidant but no tin compound, do stabilize polymer molecular weight, but give pruned cells and low fusion. Runs 4–6 show that use of a combination of DBPC and tin compound gives a polymer product with low molecular weight loss and increased fusion and better cell size in the molded products.

EXAMPLE III

To better illustrate the improved dimensional stability of foams prepared with the dialkyl tin maleate or fumarates, the following large scale moldings were performed: to a stainless steel reactor was charged 100 parts of water, 2.0 parts of tricalcium phosphate, 0.05 part of sodium dodecylbenzene sulfonate, 100 parts of polystyrene beads having bead size of between on 30 and through 16 mesh, U.S. Standard Sieve, and an intrinsic viscosity of 0.77 at 30° C. in toluene, 1.1 parts of pentabromomonochlorocyclohexane, 0.66 part of a mixture of 40 weight percent of 1,3-bis(α-tert-butylperoxyisopropyl) benzene adsorbed onto 60 weight percent of tricalcium phosphate, 0.03 part of di-tert-butyl-p-cresol, 0.1 part of polyoxyethylene(20) sorbitan monolaurate, and 7.95 parts of n-pentane. The reactor was heated to 105° C. for 7 hours, cooled to 35° C., acidified and the beads separated by centrifuging from the aqueous medium, and dried at 30° C. This sample was designated "Control A".

A second sample of beads, designated "B" was prepared identically except that 0.17 part of dibutyl tin maleate was added prior to heating the reactor.

The beads were preexpanded to a density of about 1.0 pcf. and then molded using a mold having dimensions of 98 × 25 × 18 inch to form molded foam billets. The mold was preheated with 30 psig steam for 15 seconds, filld with prepuff beads, heated for 25 seconds with 30 psig steam at 12 psig back pressure to fuse the beads and cooled for 16.5 minutes for the Control A and 35 minutes for Sample B. Internal mold fusion was measured by cutting a 1 inch slice from the center of the billets and visually counting the number of fused particles per unit area. The results were as follows:

|  | Control A | Sample B |
|---|---|---|
| Internal mold fusion, % | 32 | 75 |
| collapse, inches | 3/8 | 3/16 |
| shrinkage, inches/8 feet | 13/16 | 3/8 |

It can be seen that the dimensional stability of the billet made from Sample B, containing the tin compound was greatly improved over that of Control A.

Similar effects would be obtained if the polystyrene beads to be impregnated are replaced with beads of styrene-maleic anhydride (8.0% anhydride) copolymer beads, styrene acrylonitrile (30.0% nitrile) copolymer beads, or styrene-methyl acid maleate (12.0% maleate) copolymer beads.

EXAMPLE IV

To illustrate that the usefulness of a compound as a stabilizer cannot be predicted in an aqueous impregnation of polystyrene beads, the following was carried out:

To each of a series of 12-oz. Crown cap bottles was charged 100 g. of water, 2.0 g. of tricalcium phosphate, 0.05 g. of sodium dodecylbenzene sulfonate, 100 g. of polystyrene beads having bead size of between on 20 and through 10 mesh (U.S. Standard Sieve) and an intrinsic viscosity of 0.74 at 30° C in toluene, 1.1 g. of pentabromomonochlorocyclohexane, 0.875 g. of a mixture of 40 weight percent 1,3-bis (x-tert-butylperoxy-isopropyl) benzene adsorbed onto 60 weight percent tricalcium phosphate, 8.5 g. of n-pentane, and as antioxidant, the amounts of additives shown in the Table II.

The bottles were capped and cycled 2 hours at 90° C followed by 3 hours at 125° C in an oil bath polymerizer. The bottles were then cooled to room temperature, opened, acidified with hydrochloric acid, the beads separated from the aqueous medium, washed with water and air dried.

The polymer intrinsic viscosity was measured, again at 30° C in toluene, and the polymers were compression molded as in Example I and condition of the foams noted. The results are shown in Table II.

Table II

| Antioxidant Added | % Added | Intrinsic Viscosity | Condition Of Foam |
|---|---|---|---|
| None | — | 0.62 | Large Cell, Irregular Unmoldable |
| Dibutyl-p-cresol | 0.1 | 0.72 | Sl. large cell, moldable |
| Benzoic Acid | 0.1 | 0.61 | Large Cell, Irregular Unmoldable |
|  | 0.25 | 0.64 |  |
| Sodium (Tripoly) Phosphate | 0.1 | 0.57 | Suspension Failed [not molded] |
|  | 0.25 | 0.59 |  |
| Dilithium Salt Of Versenic Acid | 0.1 | 0.59 | Large Cell, Irregular Unmoldable |
|  | 0.25 | 0.59 |  |
| Tetraphenyl Tin | 0.1 | 0.62 | Large Cell, Irregular Unmoldable |
|  | 0.25 | 0.60 |  |

The antioxidants used and shown in Table II were all listed in U.S. Pat. No. 2,676,927 as stabilizers for organic bromides. The hindered phenol (dibutyl-p-cresol) was the only one that prevented molecular weight degradation of the polystyrene (as determined by intrinsic viscosity) and resulted in a usable foam product.

I claim:

1. In a process for making styrene polymer particles less flammable by impregnating the polymer particles by heating in aqueous suspension in the presence of a non-polymeric organic halogen compound and a blowing agent at temperatures between 100° C and 125° C, the improvement comprising adding, prior to heating for the impregnation, about 0.001 to 0.50 percent by weight, based on polymer particles, of a tin compound selected from the group consisting of dialkyl tin maleate, dialkyl tin fumarate and mixtures of these wherein the alkyl group may contain 1–20 carbon atoms and a synergistic amount of from 0.001 to 0.40 percent by weight based on polymer particles, of a hindered phenolic antioxidant consisting essentially of an alkylated phenol where said alkyl groups contain from 3 to 20 carbon atome and at least one such alkyl group is in the position ortho to the Hydroxy group of the phenol, whereby the polymer molecular weight is not degraded during the aqueous impregnation process and, whereby expandable styrene polymer particles having improved molding properties are made.

2. The process of claim 1 wherein said tin compound is di-n-butyl tin maleate and said antioxidant is di-tert-butyl-p-cresol.

3. The process of claim 1 wherein said hindered phenolic antioxidant is selected from the group consisting of alkylated phenols, and their bis-, tris-and higher condensation products with aldehydes and ketones.

4. The process of claim 1 wherein said alkylated phenol is selected from the group consisting of 1-naphthol; 2,6-di-tert-butyl-p-cresol; 3-tert-butyl-4-methoxyphenol; 2-tert-butyl-4-methoxyphenol; 2,6-diisopropylphenol; 2,4,6-tri-tert-butylphenol; 2,6-di(1-methylheptadecyl)-p-cresol; octadecyl 3-(3′,5′-di-tert-butyl-4-hydroxyphenyl)-propionate; and mixtures thereof.

5. The process of claim 1 wherein said styrene polymer particles are selected from the group consisting of polystyrene, a copolymer of styrene with less than 50% by weight of maleic anhydride, a copolymer of styrene with less than 50% by weight of acrylonitrile, and a copolymer of styrene with less than 50% by weight of methyl acid maleate.

6. The process of claim 3 wherein the antioxidant is a bis-condensation product of alkylated phenols with an aldehyde selected from the group consisting of formaldehyde, acetaldehyde, propionaldehyde, butyraldehyde, crotonaldehyde and benzaldehyde.

7. The process of claim 3 wherein the antioxidant is a bis-condensation product of alkylated phenols with a ketone selected from the group consisting of acetone, ethyl methyl ketone and diethyl ketone.

8. The process of claim 3 wherein the antioxidant is selected from the group consisting of 2,2′-methylenebis-(4-methyl-6-tert-butylphenol); 4,4′-methylenebis (2,6-dicyclohexylphenol); 4,4′-methylenebis (2,6-ditert-butyl-phenol); 2,2′-methylenebis [6-(2-methylcyclohexyl)-p-cresol]; 4,4′-ethylidenebis (2,6-di-tert-octyl-phenol); 2,2′-isopropylidenebis (6-tert-butyl-p-cresol); 4,4′-butylidenebis (6-tert-butyl-m-cresol); 4,4′-cyclohexylidenebis (2-cyclohexylphenol); 1,5-naphthalenediol; 1,1,3-tris (2-methyl-4-hydroxy-5-tert-butylphenyl)butane; 1,3,5-trimethyl-2,4,6-tris (3,5-di-tert-butyl-4-hydroxybenzyl) benzene; and tetrakis [methylene 3-(3′,5′-di-tert-butyl-4′-hydroxyphenyl) propionate] methane.

* * * * *